July 15, 1947.   V. A. TAUSCHER   2,424,198
CABLE TENSION REGULATOR
Filed Sept. 21, 1944
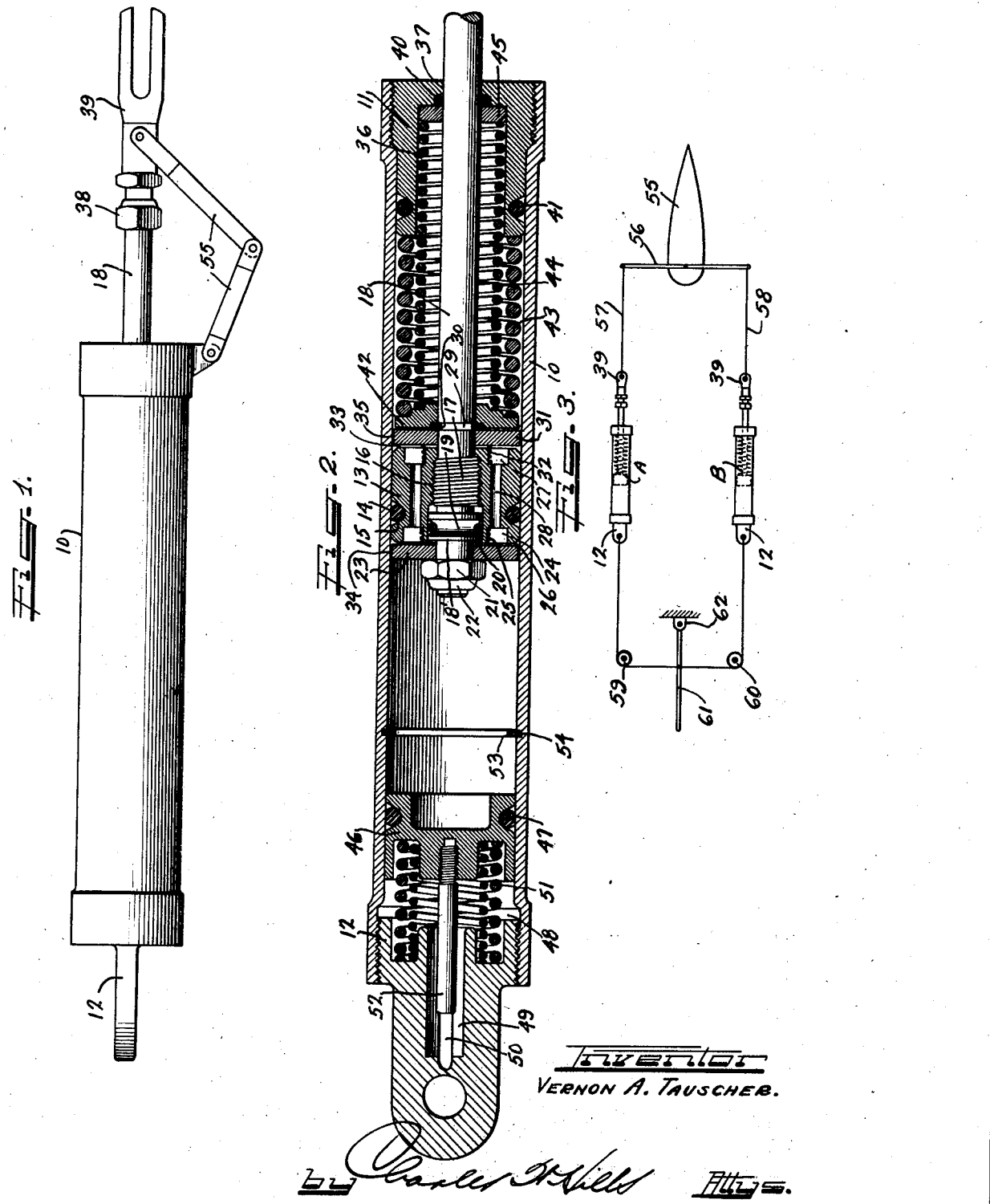
Inventor
VERNON A. TAUSCHER Patented July 15, 1947

2,424,198

UNITED STATES PATENT OFFICE 2,424,198

CABLE TENSION REGULATOR

Vernon A. Tauscher, Inglewood, Calif.

Application September 21, 1944, Serial No. 555,126

3 Claims. (Cl. 267—1)

My invention relates to cable tension regulators for maintaining predetermined tension in cables to compensate for changes in cable length under temperature variations while the cables are idle, but which are hydraulically locked out when cables are operated for setting of some control element. My invention is of particular utility where cables are comparatively long and extend through structures the coefficient of expansion of which is materially different from that of the cables, as for example in aircraft structures where cables extend from control devices in the cockpit through the fuselage or wings to flying control elements to be operated.

In my copending application Serial No. 500,022, filed August 25, 1943, now Patent No. 2,375,050, dated May 1, 1945, I disclose a tension regulating device which was designed particularly for use in airplanes for maintaining control cables under proper tension. This device in my copending application is hydraulically controlled and comprises a cylinder with a piston therein engaged by a spring so that tension will be exerted on the cable to be controlled, with a single valve mounted on the piston structure to permit interflow between opposite sides of the piston during relatively slow movement of the piston as the cable changes its length due to temperature variations, but which valve is immediately moved to establish a hydraulic lock against further movement of the piston when the cable is subjected to pull by the pilot for operation of a control.

In an airplane, momentary slacking may occur in cables independently of temperature variations. For example, deflection of the fuselage or wing structure may cause momentary slackening of control cables running therethrough, or air gusts on a control element, such as a rudder, may cause momentary slackening of the control cables. Under such conditions of slackening, the tension regulator in the slackening cable should be prevented from holding the slack after taking it up, but should return the slack when normal conditions are resumed so that the original rigging load on the cables may be maintained. It is therefore an important object of my invention to provide improved valving arrangement for cooperating with the tensioning spring of the regulator to cause return or restoration to the cable of any slack taken up thereby in order to maintain the original or normal tension or rigging load on the cables.

My invention also embodies other features of construction and control, and all of the various features will be apparent from the following detailed specification in connection with the accompanying drawings, in which drawings:

Figure 1 is a side elevation of the regulator;

Figure 2 is an enlarged longitudinal section; and

Figure 3 diagrammatically shows the inclusion of regulators in cable structure for operation of a control member.

The regulator comprises the cylinder body 10 having a closure plug 11 threaded into its outer end and a closure plug 12 threaded into its inner end. A piston 13 has bearing fit in the cylinder, and to insure against any leakage between the piston and the cylinder, a suitable packing ring 14 is provided in the circumferential groove 15 in the piston. The piston has the axial bore 16 whose outer portion is threaded for receiving the threading 17 on the piston rod 18 extending outwardly from the piston through the cylinder. The inner portion of the bore 16 is smooth and receives the head 18' on the piston rod, this head having a circumferential channel 19 for receiving a packing ring 20 for preventing leakage of hydraulic fluid between the piston and the head. The inner end of the piston rod is threaded to receive an abutment member 21 which is held in adjusted position on the stem by a locking nut 22. The member 21 forms an abutment for the annular valve disk 23 which receives and is slidable on the piston rod between the head 18' on the rod and the abutment member 21. In the inner end of the piston is the annular channel 24 within which is a spring 25 abutting the channel bottom and the valve disk 23 and tending to hold this valve disk against the abutment member 21 a distance away from the inner face of the piston to normally leave a restricted annular passageway or gap 26 between the valve disk and the piston.

In the outer end of the piston 13 is an annular channel 27 connected with the inner channel 24 by a number of ports or passageways 28 extending through the piston. Outwardly from the outer face of the piston, the piston rod has the circumferential groove 29 for receiving a split washer 30 which forms an abutment for the valve disk 31, a spring 32 within the channel tending to hold said valve disk against the abutment 30 a distance away from the outer face of the piston to leave a restricted flow gap 33 between the valve disk and the piston face.

The valves 23 and 31 may be of metal or of plastic material and have bearing fit on the piston rod but are slidable freely thereon, and the valves are of such outer diameter that their cylindrical peripheral surfaces will be separated from the inner surface of the cylinder body 10 by restricted capillary flow gaps 34, 35 respectively, of only a few thousandths of an inch in depth, a gap of .005 inch having been used.

The closure plug 11 at the outer end of the cylinder body 10 has the bore 36, and in its head has the passageway 37 for the piston rod 18, the outer end of the piston rod being threaded to receive an abutment nut 38 and a fitting 39 whereby the end of the piston rod may be connected with a cable to be controlled. The plug head is recessed to receive a packing ring 40 for preventing leakage of hydraulic fluid out of the cylinder between the plug and the piston rod. At its inner end the plug 11 may be grooved to receive a packing ring 41 for preventing leakage of the fluid between the cylinder wall and the plug.

An abutment collar 42 on the piston rod seats against the outer side of the abutment washer 30 for the valve 31, and between this abutment collar and the inner end of the plug 11 is the outer spring 43. An inner spring 44 abuts the collar 42 at its inner end and at its outer end extends into the bore 36 of the plug 11 to abut a washer 45 at the bottom of the bore 36, this washer 45 serving also to hold the packing 40 in place in the plug head.

The hydraulic fluid displacement in the cylinder occasioned by the in and out movement of the piston rod should be compensated for and the cylinder should be at all times kept full of the hydraulic fluid. I therefore provide a compensator plunger 46 in the inner end of the cylinder, a sealing ring 47 being provided for this plunger. The chamber or space 48 between the plunger and the closure plug 12 is open to the atmosphere through the bore 49 in the plug and lateral passage 50. A spring assembly 51 is interposed between the plunger and the closure plug which tends to urge the plunger outwardly in the cylinder to keep the cylinder space in which the piston 13 operates full of hydraulic fluid at all times. A stem 52 extends from the plunger into the bore 49 with its outer end exposed through the side opening 50 in the plug so that the amount of hydraulic fluid in the cylinder may be determined and to indicate when replenishment of hydraulic fluid is required. As the piston structure moves back and forth in the cylinder during operation of the regulator, the plunger 46, under pressure of the fluid or the spring assembly 51, follows the movement of the piston, and during such movement of the plunger air may flow out of or into the chamber 48.

A split ring or washer 53 which is snapped into the internal groove 54 in the cylinder forms a stop abutment against which the piston structure is held by the springs 43 and 44 when the regulator device is not installed in service. When the device is installed, the piston will be outwardly away from the abutment ring for functioning of the device for tension regulation. Figure 3 shows a cable system in which the improved regulator is utilized. The control element 55 to be operated may be the rudder in an airplane or any other flight control element. As shown diagrammatically, a bar 56 is mounted on the control device with its ends connected to cables 57 and 58 which extend around pulleys 59 and 60 and are connected to an operating lever 61 which is fulcrumed to a support 62. Upon swing of the control lever in either direction the control device 55 will be swung in corresponding direction. In the cable 57 a regulating device A is serially included and in the cable 58 a regulating device B is serially included. When the regulating devices are first installed, the pistons therein will be substantially midway between the abutment washers 53 and the inner ends of the plugs 11, with the spring assembly 43, 44 under compression for the desired normal tension on the cables to keep them taut, as shown on Figure 2. Normally the valves 23 and 31 are held open by their respective springs for exposure of the flow gaps 26 and 33. When the cable assembly is idle, slackening of a cable due to temperature change will be comparatively slowly taken up by the expansion of the springs 43—44, and contraction of the cable during temperature variations will slowly pull out the piston against resistance of the springs. During such comparatively slow movement of the piston due to variation in length of the cable under temperature changes, the valve springs 25 and 32 will hold the valves open for exposure of the flow gaps between the valves and the piston so that the displaced hydraulic fluid may flow from one side of the piston to the other through the ports 28. If pull is exerted on a cable for operation of the flight control device, such as the rudder 55, outward movement of the piston 13 will be substantially immediately checked so that the full pull by the pilot will be directly communicated to the control device. The instant the piston attempts to move outwardly under control operation pull, the hydraulic fluid in the outer portion of the cylinder will be subjected to pressure and the only escape of the hydraulic fluid will be through the narrow capillary gap 35 between the valve disk 31 and the cylinder wall and this checking of the flow past the valve disk will cause the pressure built up behind the valve to close the valve practically at the instant of outward movement of the piston, and the established hydraulic lock will then hold the piston for direct transmission of the control pull by the pilot to the flight control device to be operated. As soon as the operating pull on the cable is released, the hydraulic pressure back of the valve will be relieved and the valve will be reopened by its spring 32.

The addition of the valve 23 at the inner end of the piston is for the purpose of preventing the regulator device from taking up and holding any slack which may occur in the cable under various conditions, and to cause the regulator, after taking up such slack, to restore it to the cable assembly so that normal cable tensioning may be maintained. Referring to Figure 3, suppose that the pilot swings the control lever 61 toward the right for corresponding operation, through the cable 57, of the control device 55. Under such operation, the cable 58 may be slackened, and the spring assembly 43—44 in the regulator device B would then tend to quickly shift the piston structure inwardly to take up this slack in the cable 58 and, if it were not for the valve 23 at the inner end of the piston, the piston would then be locked against outward movement when the load on the cable 57 is released, and the tension upon the cable assembly would become greater than normal by the amount of slack which has been taken up and held by the regulator device B. However, with the valve 23 provided on the inner end of the piston, when the slack occurs in cable 58 when the cable 57 is put under load, the inward movement of the piston by the spring assembly will be immediately checked by closure of the valve 23 by the pressure built-up in the space between the piston and the compensator plunger 46. Flow past the piston structure being now shut off by the valve 23, any further inward movement of the piston structure in the regulator B by the spring assembly 43, 44 will cause partial vacuum in the outer portion of the cylinder and then, upon release of the control lever 61 and unloading of cable 57, the piston will return to normal position and any slack which was taken up thereby from the cable 58 will be restored to the cable so that the normal tension conditions in the cable assembly will be restored and maintained.

Owing to the almost instantaneous functioning of the valves on the piston, movement of the piston by cable pull thereon or by pressure of the springs will be practically instantaneously stopped, and under cable slackening conditions above referred to, the spring assembly may move the piston under creation of vacuum in the outer portion of the cylinder to take up the slack. Such inward movement of the piston by the spring assembly to take up slack will be against the pressure of the hydraulic fluid in the space between the piston and compensator plunger 46, but this plunger will move outwardly against the resistance of the spring assembly 51 and then, when slack has been taken up by the cable 58 as the cable 57 is unloaded by release of the control lever 61, the vacuum pull in the outer portion of the cylinder and the pressure of the spring assembly 51 will move the piston back to its normal position for restoration to the cable 58 of the slack which was taken up therefrom.

It may also happen that slack is momentarily introduced in a cable due to deflections in the fuselage or wings through which the cable extends, or due to air gusts against a flight control device, such as the rudder 55. However, under such conditions the tension regulator device will take up the slack and restore it to the cable, in a manner described.

It may be desirable to prevent relative rotation between the piston structure and the cylinder, and a suitable linkage connection, such as the connection 55 shown on Figure 1, may be provided between the cylinder and the outer end of the piston rod which will permit free relative axial movement of the cylinder and piston structure but will prevent relative rotational movement.

When the regulator device is serviced for operation, hydraulic fluid such as oil is forced into the cylinder under sufficient pressure for outward shift of the compensator plunger 46 for compression of the spring assembly 51 so that, while the regulator is in service, the pressure of the plunger against the hydraulic fluid under the pressure of the loaded spring assembly, will keep filled with fluid the portion of the cylinder in which the piston operates. During comparatively very slow movement of the piston in the cylinder under change in length of a control cable by temperature variation, the inner and outer valve disks on the piston will be held open by their springs for flow of hydraulic fluid from one side of the piston structure to the other. However, upon loading the cable by operating control pull thereon, attempted follow-up outward movement of the piston will be immediately checked by closure of the outer valve disk and hydraulic lock will be established, and upon the sudden occurrence of slack in a cable, then follow-up movement of the piston by the pressure of the compression spring will be practically instantaneously checked by the inner valve disk on the piston and any further inward movement of the piston by the spring to take up slack would create vacuum in the outer end of the cylinder, which vacuum would assist in restoring the piston to its outer position for returning of the slack to the cable so that the normal tension conditions in a cable or in a cable assembly will be maintained.

I have shown a practical and efficient embodiment of the features of my invention, but I do not wish to be limited to the exact construction or arrangement shown and described as changes and modifications may be made without departing from the scope of the invention as defined by the appended claims.

I claim as my invention:

1. A tension regulator for regulating the tension of a control operating cable in an airplane, comprising a closed hydraulic fluid-filled cylinder; a piston structure in the cylinder having a rod extending therefrom to the exterior in engagement with the cable to be regulated; a compression spring in the outer end of the cylinder having engagement with the piston structure tending to shift it inwardly for tensioning of the engaged cable; said piston structure having a passageway therethrough for flow between opposite ends of the cylinder; abutments on said piston structure adjacent to the inner and outer ends thereof; valves in the form of annular disks movable on said piston structure between the respective ends of the piston structure and the abutments thereon for controlling the flow through said piston structure passageway; springs tending to hold said valves against their respective abutments for exposure of said piston structure passageway for flow therethrough; the peripheral surfaces of said valves being concentric with the inner surface of said cylinder; and said valves being comparatively thick and of such diameter as to leave only restricted annular capillary gaps between the valves and the cylinder; said valve springs functioning to hold said valves open for flow between the ends of said cylinder during slow and gradual movement of the piston structure in response to temperature variations in the cable, the flow resistance through said capillary gaps being such that when said piston structure is displaced more rapidly by operating tension of the cable or by the force of said compression spring, the displaced hydraulic fluid flow through said gaps will be checked and the built up pressure will cause substantially immediate closure movement of the respective valves to stop further flow and the further movement of the piston structure; and a packing ring about said piston to prevent leakage between the piston and cylinder when a valve is closed against the piston and the cable is tensioned.

2. A tension regulator for regulating the tension of a control operating cable in an airplane; comprising a closed hydraulic fluid-filled cylinder; a piston structure in the cylinder having a rod extending therefrom to the exterior in engagement with the cable to be regulated; a compression spring in the outer end of the cylinder having engagement with the piston structure tending to shift it inwardly for tensioning of the engaged cable; said piston structure having a passageway therethrough for flow between opposite ends of the cylinder; abutments on said piston structure adjacent to the inner and outer ends thereof; valves in the form of annular disks movable on said piston structure between the respective ends of the piston structure and the abutments thereon for controlling the flow through said piston structure passageway; springs tending to hold said valves against their respective abutments for exposure of said piston structure passageway for flow therethrough; the peripheral surfaces of said valves being concentric with the inner surface of said cylinder; and said valves being comparatively thick and of such diameter as to leave only restricted annular capillary gaps between the valves and the cylinder, said valve springs functioning to hold said valves open for flow between the ends of said cylinder during slow and gradual movement of the piston structure in response to temperature variations in the cable, the flow resistance through said capillary gap being such that, when the piston structure is tended to be displaced more rapidly outwardly by operating tension of the cable or more rapidly inwardly by said compression spring upon the sudden occurrence of slack in the cable, the pressure of the displaced fluid will substantially instantaneously cause closure of the respective valves to check flow through the piston structure passageway; a plunger in the inner end of said cylinder and spring means tending to shift said plunger towards the other end of the cylinder against the hydraulic fluid in the cylinder to keep the cylinder filled, whereby, upon occurrence of sudden slack in the cable, said compression spring may function after closure of the inner valve to shift the piston structure inwardly against the generation of vacuum in the outer end of the cylinder to take up slack in the cable, and whereby the force of said vacuum and the pressure of said plunger will function to restore the taken up slack to the cable.

3. In an aircraft, in which a cable extends to a flight control; a tension regulator for the cable comprising a closed hydraulic fluid-filled cylinder connected with the cable; a piston structure within the cylinder having a rod extending therefrom and connected with the cable; a compression spring within the cylinder tending to move said piston structure inwardly to take up slack in the cable; said piston structure having a flow passageway therethrough; a valve on said piston structure for the outer end of said passageway and a spring tending to hold said valve open to expose said passageway; said valve functioning upon operating pull on said cable to be closed by the displaced hydraulic fluid to shut off said passageway to lock said piston against further outward movement; a valve on the inner end of said piston structure for the outer end of said passageway and a spring tending to hold said valve open for exposure of said passageway; a plunger in the inner end of said cylinder and a spring assembly therefor tending to shift it towards the other end of the cylinder for exertion of pressure against the hydraulic fluid in the cylinder to keep the cylinder filled; said compression spring, upon the occurrence of slack in the cable, tending to shift said piston structure inwardly but said valve at the inner end of said piston structure then functioning to close said passageway against said further flow of displaced fluid whereby any further movement of said piston structure by said compression spring to take up cable slack will be against the generation of vacuum in the outer end of the cylinder and against the pressure of said plunger and whereby, when said cable is again put under tension, the force of the vacuum and the pressure of the plunger will move the piston structure outwardly for restoring of the taken up slack to the cable.

VERNON A. TAUSCHER.

REFERENCES CITED

The following references are of record in the file of this patent:

UNITED STATES PATENTS

| Number | Name | Date |
|---|---|---|
| 2,323,352 | Pitts | July 6, 1943 |
| 2,252,771 | Katcher | Aug. 19, 1941 |
| 2,314,404 | Katcher | Mar. 23, 1943 |
| 2,118,455 | Wallace | May 24, 1938 |
| 2,248,836 | Wallace | July 8, 1941 |
| 2,365,247 | Carlton | Dec. 19, 1944 |